United States Patent [19]
Hospodor et al.

[11] Patent Number: 5,771,397
[45] Date of Patent: Jun. 23, 1998

[54] SCSI DISK DRIVE DISCONNECTION/ RECONNECTION TIMING METHOD FOR REDUCING BUS UTILIZATION

[75] Inventors: Andrew D. Hospodor, Los Gatos; Hoa Luong, Fremont, both of Calif.

[73] Assignee: Quantum Corporation, Milpitas, Calif.

[21] Appl. No.: 752,968

[22] Filed: Dec. 2, 1996

Related U.S. Application Data

[63] Continuation of Ser. No. 164,899, Dec. 9, 1993, abandoned.

[51] Int. Cl.[6] .................................................. G06F 13/28
[52] U.S. Cl. ........................ 395/855; 395/842; 395/877
[58] Field of Search ................................. 395/877, 855, 395/842

[56] References Cited

U.S. PATENT DOCUMENTS

| | | | |
|---|---|---|---|
| 4,378,588 | 3/1983 | Katzman et al. ........................ | 395/877 |
| 4,571,671 | 2/1986 | Burns et al. ............................ | 395/855 |
| 5,193,193 | 3/1993 | Iyer ........................................ | 395/297 |
| 5,224,213 | 6/1993 | Dieffenderfer et al. ................ | 395/873 |
| 5,228,134 | 7/1993 | MacWilliams et al. ................ | 711/138 |
| 5,247,626 | 9/1993 | Firoozmand ....................... | 395/200.42 |
| 5,265,211 | 11/1993 | Amini et al. ............................ | 395/856 |
| 5,283,883 | 2/1994 | Mishler .................................. | 395/853 |
| 5,533,205 | 7/1996 | Blackledge et al. .................... | 395/297 |
| 5,568,648 | 10/1996 | Coscarella et al. ..................... | 395/862 |
| 5,613,162 | 3/1997 | Kabenjian .............................. | 395/842 |

*Primary Examiner*—Parshotam S. Lall
*Assistant Examiner*—Kenneth R. Coulter
*Attorney, Agent, or Firm*—David B. Harrison; John C. Chen

[57] ABSTRACT

A method of responding to a request for data over a bus structure, such as a SCSI bus. Upon receiving a request, a data storage device releases control of the bus and accumulates the requested data in a buffer. Before the data has been completely accumulated, the device acquires control of the bus and begins transmitting the data over the bus. The beginning of transmission occurs late enough that the transmission can occur in a single burst. If the data can be transmitted over the bus in a time period $t_{burst}$, then the beginning of transmitting should begin substantially a $t_{burst}$ period before the time at which the buffer completes accumulating the requested data.

8 Claims, 5 Drawing Sheets

| ZONE | SECTORS PER TRACK | SECTOR TIME (μs) | CHANNEL RATE (MB/s) | RATIO, HOST RATE OF 5 MB/s | RATIO, HOST RATE OF 10 MB/s |
|---|---|---|---|---|---|
| 0 | 107 | 103.84 | 4.93 | 0.0139 | 0.5069 |
| 1 | 107 | 103.84 | 4.93 | 0.0139 | 0.5069 |
| 2 | 107 | 103.84 | 4.93 | 0.0139 | 0.5069 |
| 3 | 107 | 103.84 | 4.93 | 0.0139 | 0.5069 |
| 4 | 107 | 103.84 | 4.93 | 0.0139 | 0.5069 |
| 5 | 106 | 104.82 | 4.88 | 0.0231 | 0.5116 |
| 6 | 102 | 108.93 | 4.70 | 0.0600 | 0.5300 |
| 7 | 98 | 113.38 | 4.52 | 0.0968 | 0.5484 |
| 8 | 94 | 118.20 | 4.33 | 0.1337 | 0.5668 |
| 9 | 88 | 126.26 | 4.06 | 0.1890 | 0.5945 |
| 10 | 84 | 132.28 | 3.87 | 0.2259 | 0.6129 |
| 11 | 82 | 135.50 | 3.78 | 0.2443 | 0.6221 |
| 12 | 79 | 140.65 | 3.64 | 0.2719 | 0.6360 |
| 13 | 74 | 150.15 | 3.41 | 0.3180 | 0.6590 |
| 14 | 70 | 158.17 | 3.23 | 0.3549 | 0.6774 |
| 15 | 65 | 170.94 | 3.00 | 0.4010 | 0.7005 |

SCSI DISK DRIVE DISCONNECTION/ RECONNECTION TIMING METHOD FOR REDUCING BUS UTILIZATION

This Application is a continuation of Ser. No. 08/164,899, filed Dec. 9, 1993, now abandoned.

FIELD OF THE INVENTION

The present invention pertains to the field of data storage devices. More specifically, it relates to a method for improving transmission of data from a target storage device to a host computer over a predetermined bus structure, such as SCSI.

BACKGROUND OF THE INVENTION

A computer can request information from a data storage device which is connected to the computer via a bus structure. When the target data storage device transfers information to the host as a series or sequence of DMA bursts as the data becomes available, the host sees a fast response time in receiving the entire transfer. However, bus efficiency may not be optimal, particularly if the bus transfer rate is greater than the rate at which the data is retrieved from the storage medium and becomes available for transfer over the bus by the storage device. Other devices wanting to use the bus structure must wait the entire time that the data is being retrieved and sent by sequential bursts by the storage device, rather than for a shorter transmission time when the data is sent in a single burst over the bus structure at its optimal bus transfer rate.

The Small Computer System Interface standard (SCSI) describes a bus structure that can be used in a multi-initiator, multi-target environment. To maximize bus efficiency, SCSI permits a target device, such as a data storage device, to disconnect from the SCSI bus while the target processes a time-consuming data access operation. Once the target is ready to continue data transfer to an initiator (host computer), the target device reconnects to the bus.

Thus, to optimize bus usage, a data storage device can disconnect from the bus, accumulate any requested data in its local buffer memory, reconnect to the bus, and then transmit the entire requested data in a single burst. However, the host must wait a longer time to receive the complete transfer of data.

The SCSI standard provides the buffer full/empty parameters in mode select page 02h to control how full a target's buffer memory may become before beginning to transmit over the bus. This protocol is intended to minimize the number of disconnects and reconnects required to complete a transfer, yet enable the target device to begin transmitting before the target's entire buffer capacity is full. However, these parameters are optimal for only a specific transfer length and buffer accumulation rate.

The buffer accumulation rate for a hard disk is related to read/write channel rates. Data is typically recorded as blocks or sectors in concentric data tracks on the disk storage surface. Inner tracks have smaller circumferences than outer tracks. At a constant disk rotation rate, inner tracks will store less data, and transfer data at a lower rate, than outer tracks. One commonly employed technique is to tailor data transfer rates and the number of data blocks or sectors to track radius. Frequently, bands of adjacent tracks are arranged as "zones" on the data storage surface. Transfer rate and the number of data sectors per track are held constant for all of the tracks of the particular zone. With this "zoned data" arrangement, data transfer performance otherwise decreases for different transfer lengths and zones on the disk.

A hitherto unsolved need has been for a method of responding to a request for data which maximizes efficiency of a bus, yet does not delay the response time as seen by the requester of the data.

SUMMARY OF THE INVENTION WITH OBJECTS

A general object of the present invention is to provide a method for improving transmission of data from a target storage device to a host computer over a predetermined bus structure, such as SCSI.

Another object of the present invention is to provide a method for responding to a request for data in a manner which maximizes efficiency of transfer over a bus structure such as SCSI without delay of response time as seen by the requester of the data.

According to the present invention, when a data storage device such as a hard disk drive, for example, receives a request for data from a host computer via a bus structure, the storage device releases control of the bus. The device then seeks to a destination location at which the requested data is stored and begins to accumulate the requested data in a buffer. The device then acquires control of the bus and transmits the accumulated data over the bus. To speed the response time as seen by the requester of the data, the data storage device begins transmitting before the data has been fully accumulated in its local buffer memory, but late enough such that the data can be transmitted to the requester in a single burst over the bus structure. That is, all of the requested data will have been accumulated in the buffer at the time the data storage device is transmitting it as a single burst.

As a feature of the present invention, the time at which an optimized burst transmission begins can be calculated. If the data can be transmitted over the bus in a time period $t_{burst}$, then the beginning of transmission should occur substantially a $t_{burst}$ period before the time at which the buffer completes accumulating the requested data, so that the processes of accumulation and transmission end at substantially the same moment.

According to another aspect of the invention, if the buffer is not large enough to accumulate all of the requested data, the data storage device releases control of the bus and begins to accumulate the requested data in a buffer to the capacity of the buffer. The device then acquires control of the bus and transmits the accumulated data over the bus. The beginning of transmission occurs before the buffer is completely filled but late enough such that the contents of the entire buffer can be transmitted in a single burst. The data storage device repeats the steps of releasing control of the bus, accumulating data, acquiring control of the bus, and transmitting data over the bus until all of the requested data has been transmitted to the requester.

As another feature of the invention, if the entire buffer can be transmitted over the bus in a time period $t_{burst}$, then the beginning of transmission should occur substantially a $t_{burst}$ period before the time at which the buffer completes accumulating the requested data.

The foregoing and additional objects, features and advantages of the present invention will be more readily apparent from the following detailed description of preferred embodiments thereof which proceed with reference to the accompanying drawings.

DETAILED DESCRIPTION OF THE INVENTION

Figures 1, 4:
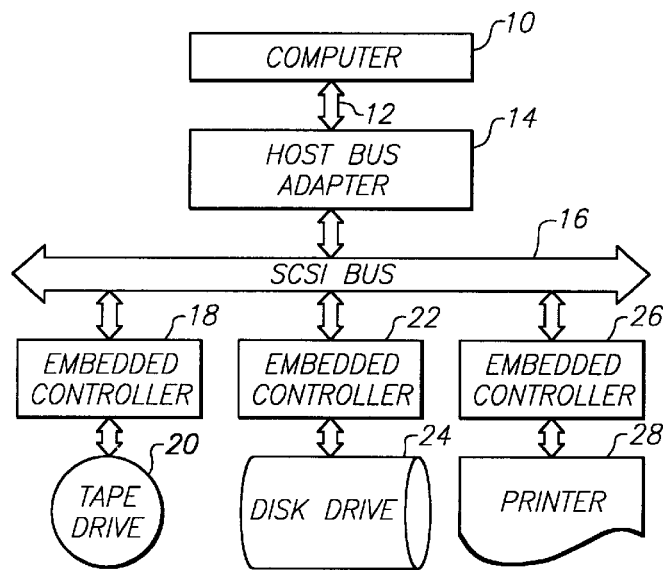
FIG. 1 is a general block diagram of an exemplary Small Computer System Interface bus having a single host (SCSI initiator) and three peripheral units (SCSI targets).
FIG. 4 is a table of precalculated values used in the method of the present invention.

Referring to FIG. 1, a computer 10 is connected to a host adapter 14 via its internal system bus 12. The host adapter enables the computer to connect to a Small Computer System Interface (SCSI) bus 16. The host adapter 14, as controlled by the computer 10, acts as a SCSI "initiator." That is, the host adapter requests "targets" on the SCSI bus to perform operations.

A tape drive 20, a disk drive 24, and a printer 28 are connected to the SCSI bus 16 by way of respective embedded controllers 18, 22, 26. These devices are targets on the SCSI bus and perform operations as requested by the host adapter 14.

Figure 2:
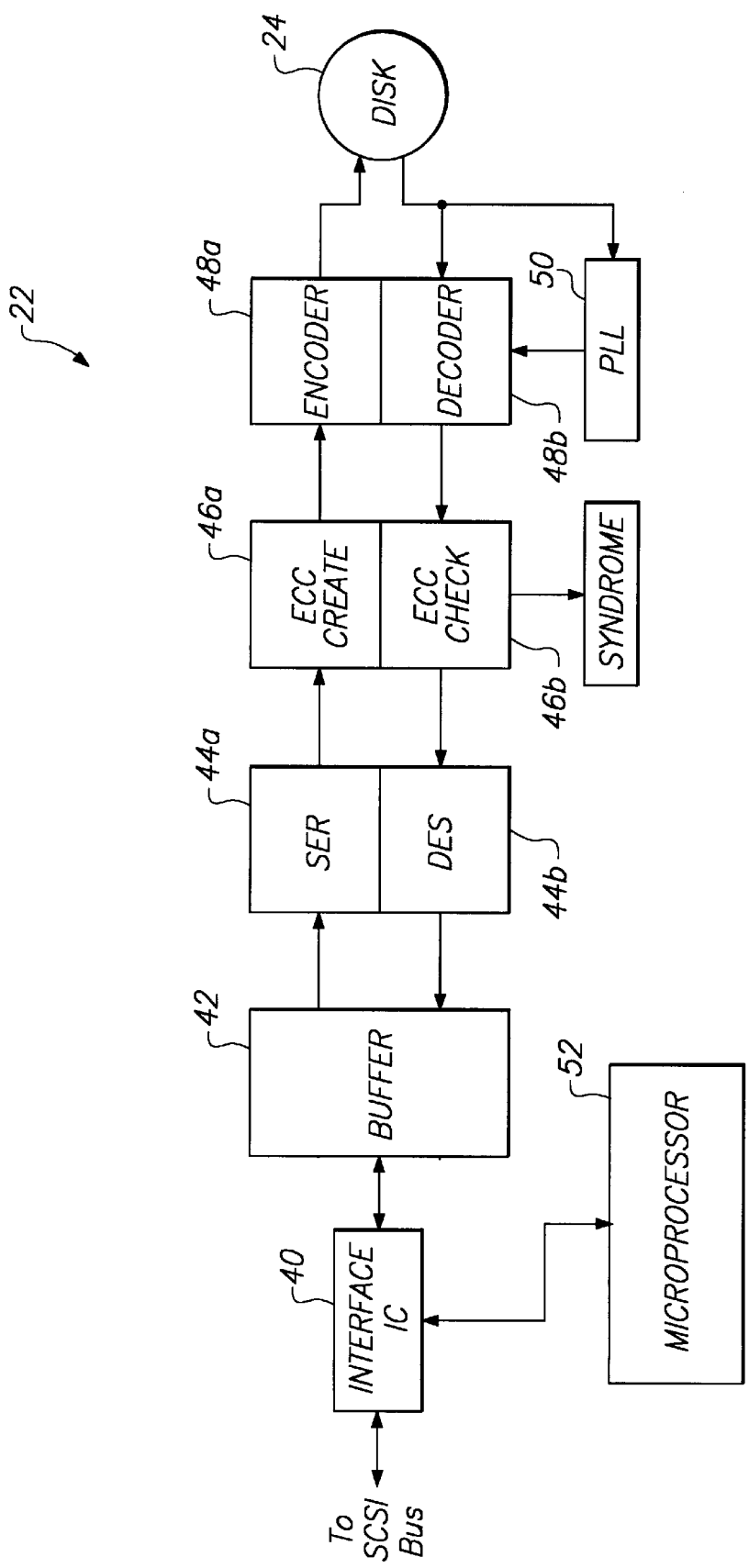
FIG. 2 is a detailed block diagram of a target of FIG. 1.

Referring now to FIG. 2, a typical disk drive embedded controller 22 includes a SCSI interface integrated circuit (IC) 40. The SCSI interface IC takes commands, data, and messages from the SCSI bus and processes them. Data to be stored on the disk drive 24 is stored in a buffer and converted to a serial stream by a serializer 44a. Error correction codes are added to the serial stream by an ECC create circuit 46a. The resulting binary stream is encoded by an encoder 48a and stored on the disk drive 24.

Data retrieved from the disk 24 goes through the above-described process in reverse. The retrieved data is decoded by a decoder 48b and phase-lock-loop circuit 50. An ECC check circuit 46b detects and corrects errors and sends the resulting serial stream to a deserializer 44b. The resulting bytes are stored in the buffer 42. The SCSI interface IC 40 sends the bytes in the buffer 42 to the host computer 10 by way of the SCSI bus 16.

A microprocessor 52 controls the operation of the SCSI interface IC 40. The microprocessor controls whether and when the SCSI interface IC process commands, messages, and data from the host computer 10.

Figure 3:
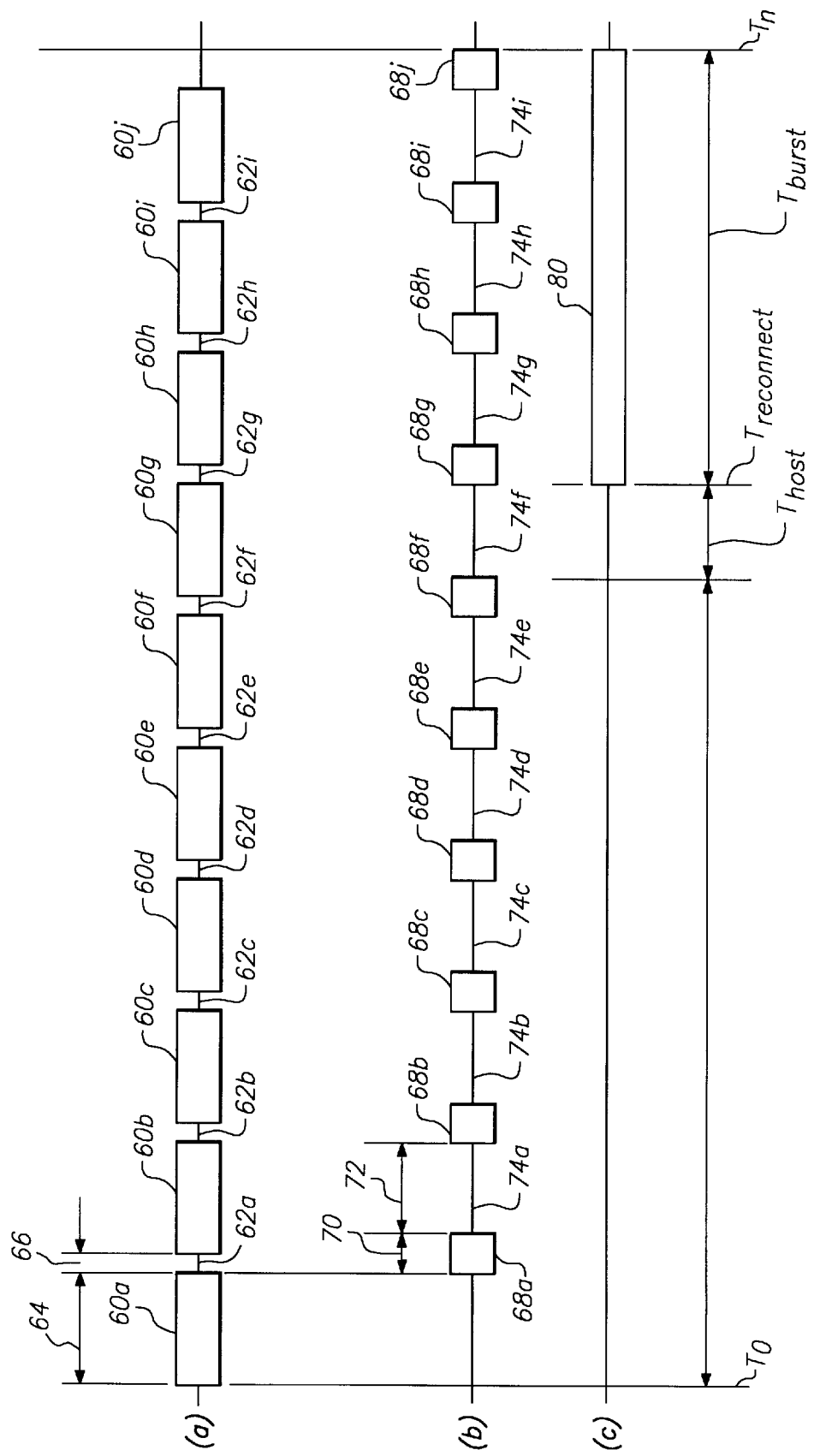
FIG. 3 is a timing diagram of Read/Write Channel and Host Interface activity according to the present invention.

Referring now to FIG. 3, the top row (a) shows a string of ten blocks 60a–60j read from the disk drive 24 over the read/write channel to the buffer 42. The gaps 62a–62i between the blocks represents times during which the read/write channel is idle because the read/write head is passing over sector overhead information which may include sector headers as well as embedded sector head positioning servo information.

In an exemplary hard drive, each block contains 512 bytes of data. If the read/write channel transfers data at four Megabytes per seconds (MB/s), then the time 64 for the transfer of each block 60a–60j takes 128 microseconds (s). Taking into account an exemplary gap time of 25 s, the effective read/write channel rate is 3.35 MB/s. The second row (b) shows respective transfers of the blocks 68a–68j from the buffer 42 over the SCSI bus 16 to the host adapter 14. Each transfer from the buffer occurs as soon as it has been transferred to the buffer over the read/write channel. Thus, transfer of block 68c over the SCSI bus occurs immediately after transfer of block 60c over the read/write channel. The transfer of the last block 68j ends at time $T_n$.

If the SCSI bus transfers data at 10 MB/s, the time 70 for the transfer of each block takes approximately 51 s. There is thus an approximately 102 s long gap 74a–74i between each block.

To ensure that each transfer 68a–68j over the SCSI bus can occur as soon as the data is in the buffer 42, the transfer would have to be non-disconnecting. Otherwise, other target devices on the SCSI bus may take control of the bus, delaying transfer of the information.

The SCSI bus 16 is used with maximum efficiency when a disk drive transfers requested data in a single burst. Furthermore, according to the present invention, a target disk drive can complete the sending of data over the SCSI bus 16 in the same amount of time as a non-disconnecting operation.

According to the present invention, the embedded controller 22 of the drive 24 remains disconnected from the SCSI bus 16 as long as possible, yet still finish the data transfer at time $T_n$. Referring now to row (c) of FIG. 3, the entire transfer is accumulated in the buffer 42 and transferred over the SCSI bus 16 in one burst 80.

The time required to transfer the burst, $T_{burst}$, may be calculated from the requested transfer length xfer_len contained in the SCSI Command Descriptor Block (CDB) and the host transfer rate, host_rate, as shown in equation (1). The host transfer rate is negotiated between hosts and targets on a SCSI bus after power-on, with the Synchronous Device Transfer Request (SDTR) message.

$$T_{burst} = \frac{xfer\_len}{host\_rate} \quad (1)$$

The time at which the burst begins, time $T_{reconnect}$, is calculated such that the end of the burst 80 occurs at time $T_n$. However, once the controller 22 of the target drive 24 has disconnected from the SCSI bus 16, it must reconnect before sending data. Thus, some additional time, $T_{host}$, is allocated to enable the host to respond to reselection and ensure that data transfer can begin sending at time $T_{reconnect}$.

This amount of additional time $T_{host}$ can depend on a number of factors and may not be exactly known. If the time $T_{host}$ is selected to be too short, then the end of the transfer $T_n$ to the host will be delayed by the amount of the error. However, if the time $T_{host}$ is selected to be too long, then the buffer 42 will not contain data when the SCSI interface IC 40 is ready to send it over the bus. In an exemplary target drive 24, a time $T_{host}$ of 100 s is used.

The time $T_{reconnect}$ can be calculated according to equation (2).

$$T_{reconnect} = T_0 + \frac{xfer\_len}{channel\_rate} - \frac{xfer\_len}{host\_rate} - T_{host} \quad (2)$$

As shown by equation (2), the controller 22 of the drive 24 can calculate the optimal reconnect time from the transfer length xfer_len, the channel transfer rate channel_rate, and the host transfer rate host_rate. However, most disk drives do not have a dedicated timer to interrupt the microprocessor 52 at time $T_{reconnect}$. It may be easier to calculate the number of bytes in the buffer 42 at $T_{reconnect}$ and use that "count" to indicate time $T_{reconnect}$.

$$count = [T_{connect} - T_0] \cdot channel\_rate \quad (3)$$

Substituting the right side of equation (2) into equation (3) yields equation (4).

$$\text{count} = \left[ \frac{xfer\_len}{channel\_rate} - \frac{xfer\_len}{host\_rate} - T_{host} \right] \cdot channel\_rate \quad (4)$$

product of the $T_{host}$ and channel_rate provides a margin, in bytes, for the host computer to respond to reselection. These "fudge_bytes" are constant, and may be moved outside the parenthesis to simplify the formula.

$$\text{count} = \left[ \frac{xfer\_len}{channel\_rate} - \frac{xfer\_len}{host\_rate} \right] \cdot channel\_rate - fudge\_bytes \quad (5)$$

Equation (5) may then be simplified, as shown in equation (6).

$$\text{count} = xfer\_len \cdot \left[ 1 - \frac{channel\_rate}{host\_rate} \right] - fudge\_bytes \quad (6)$$

Equation (6) may also be expressed as a high water mark count, in which channel_rate/host_rate represents buffer_ratio, as follows:

$$\text{count} = xfel\_len \cdot [1 - buffer\_ratio] - fudge\_bytes \quad (7)$$

To minimize the amount of calculations that must be performed, a table of [1—channel_ratelhost_rate] values preferably is constructed, with an entry for each zone on the disk. The table is updated whenever a new host_rate is negotiated with a SDTR message. The arrival of a read command triggers the calculation of optimal reconnect, and requires only a table lookup, one multiplication, and one subtraction. These operations may be overlapped with a seek or rotational latency operation.

Referring now to FIG. 4, a table of [1– channel_rate/host_rate] ratios is provided for an exemplary disk rotating at e.g. 5400 revolutions per minute (RPM). Each sector contains a single block of 512 bytes. To optimize storage on the drive, different concentric zones on the disk have a different number of sectors per track, depending upon zone radius. The first and second columns contain the zone number and number of sectors per track, respectively. The third and fourth columns show the amount of time required for the disk 24 to rotate a single sector past a read/write head and the resulting channel rate. The last two columns show the [1– channel_rate/host_rate] values for host rates of 5 MB/s and 10 MB/s, respectively.

In the usual case, the transfer length xfer_len is a power of 2, that is 512, 2048, or 8192. In such a case, the multiplication in equation (6) is simply a binary shift left operation.

The present invention has been described such that the buffer 42 is large enough to contain the entire length of a transfer. If the transfer length is larger than can be contained in the buffer, the present invention may still be used advantageously by using the buffer size in place of the transfer length xfer_len in the above calculations. In such a case, more than one burst will be required to complete the transfer.

Figure 5:
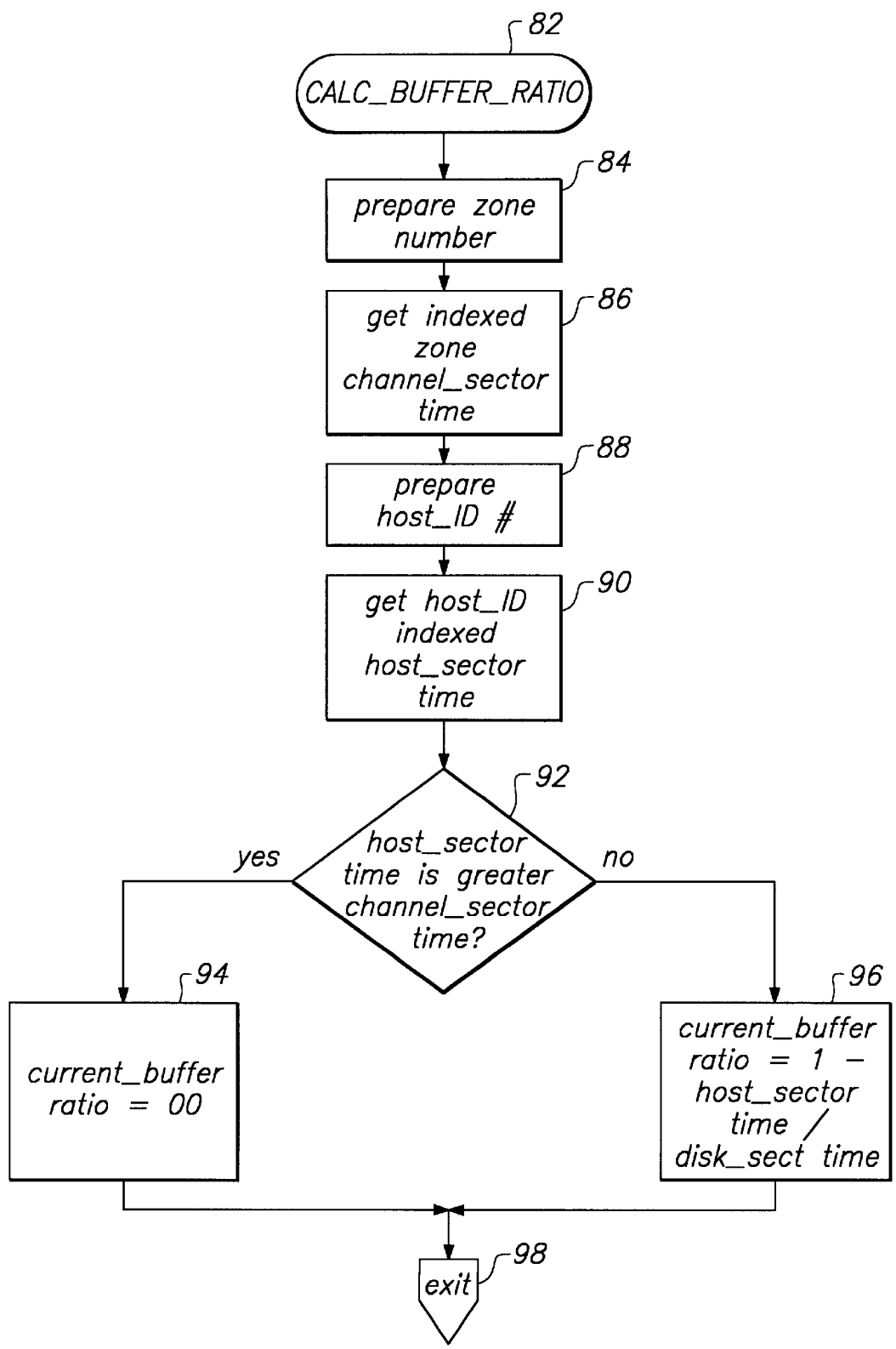
FIG. 5 is a flowchart for a routine for calculating buffer ratio in accordance with principles of the present invention.

Referring now to FIG. 5, a buffer ratio formula 82 (Equation 7) is calculated by the microprocessor 52 following arrival of a read command from the host computer adapter 14 via the SCSI bus 16. This calculation is preferably carried out while a head positioning servo loop is repositioning the selected data transducer head to a destination track during a track seeking operation. During the FIG. 5 routine 82, a step 84 obtains the zone number of the zone including the destination track location. A step 86 then obtains the indexed zone's channel_sector time, e.g. by reference to appropriate data in FIG. 4. A step 88 obtains the host_ID number which identifies the host adapter 14. A step 90 then determines the host_ID indexed host_sector time, also preferably as a table lookup. A logical node 92 then determines if the host_sector time is greater than the channel_sector time. If so, a process step 94 sets the current_buffer ratio to a null value (00). If not, a process step 96 then determines the current_buffer ratio as 1—host_sector time/disk_sector time. After this determination, a return is made at an exit node 98.

Figure 6:
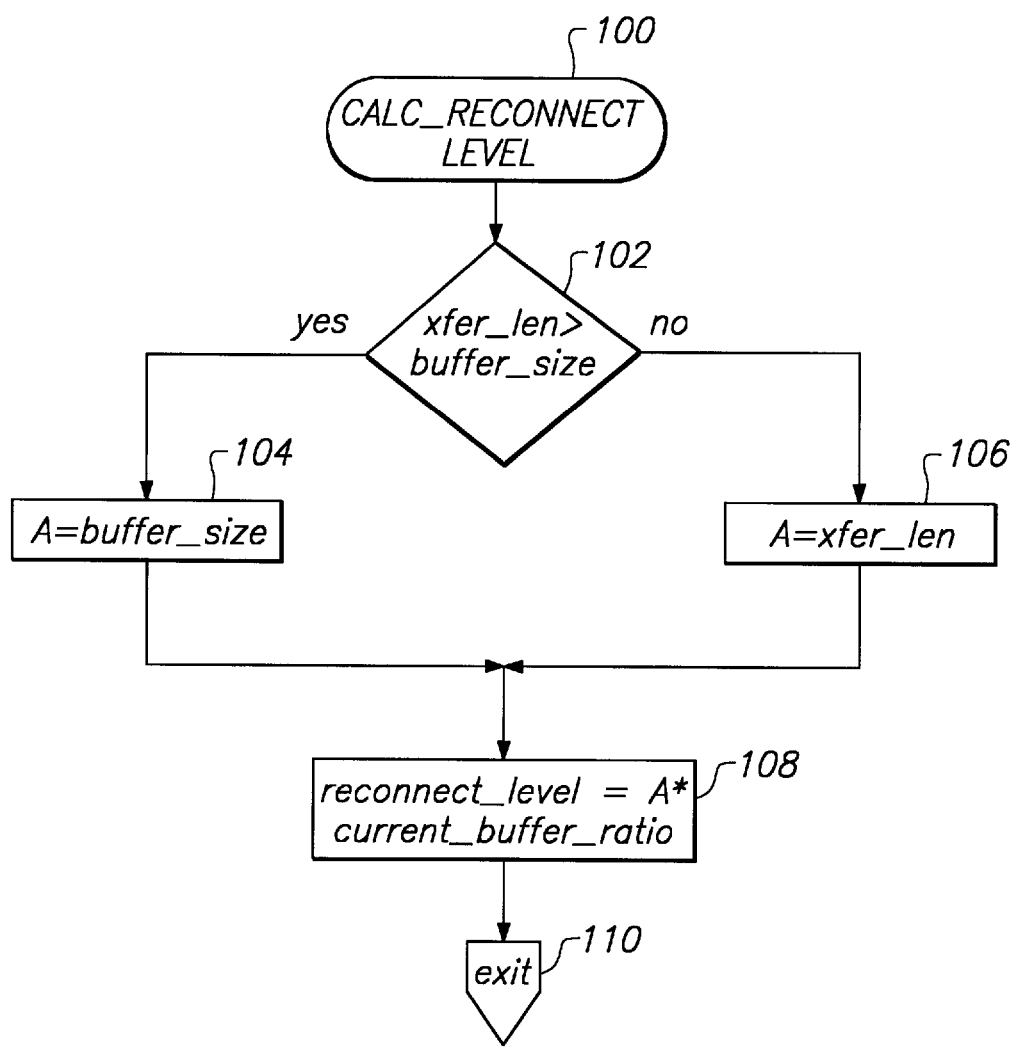
FIG. 6 is a flowchart for a routine for calculating reconnect level in accordance with principles of the present invention.

Referring now to FIG. 6, a reconnect level formula 100 is calculated by the microprocessor 52 at the reconnect time. This formula 100 includes a logical node 102 which determines whether the transfer_length is greater than the buffer_size. If so, a process step 104 sets a value A to equal the buffer_size. If not, a process step 106 sets the value A to be equal to the transfer length xfer_len. A process step 108 then determines a reconnect level as equal to A·current_buffer ratio which was determined at steps 94 or 96 during seek time as explained in connection with FIG. 5. After the reconnect level is calculated, a return is made at an exit node 110.

In this manner, the reconnect and transmission from buffer steps will take approximately the same amount of time as is required to obtain all of the data from the data storage disk, so that the steps of accumulating the data in the buffer and transmitting the data from the buffer to the host or initiator will end approximately at the same time, thereby realizing an optimal reconnect process. While the present invention has been described in terms of the SCSI bus standard, it will be recognized by those skilled in the art that the invention has utility for other data busses as well.

The terms and expressions that have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims that follow.

What is claimed is:

1. A method, for a mass storage device on a bus shared by a plurality of contending data handling devices, of responding to a request for a specified number of fixed length data blocks from another device on the bus, the mass storage device including a buffer which can accumulate and transmit requested data blocks stored within the mass storage device, the method comprising the steps of:

(a) acquiring control of the bus to receive the request for the specified number of data blocks;

(b) releasing control of the bus;

(c) initiating accumulation of a first available one of the specified number of data blocks in the buffer;

(d) determining a bus reconnect time for transfer of the specified number of data blocks as a single burst, the bus reconnect time being based upon the number of data blocks requested, a bus data transfer rate, and an internal data transfer rate within the mass storage device, such that the mass storage device will release the bus immediately following transmission over the bus of a last one of the specified number of data blocks, (e) re-acquiring control of the bus by the mass storage device at approximately the determined reconnect time and before all of the requested data blocks are accumulated in the buffer;

(f) transmitting in a single burst all of the requested data blocks accumulated in the buffer over the bus to the other device and (g) releasing the bus following transmission of the last one of the specified number of data blocks.

2. The method of claim 1, wherein the determining step determines a block transmission time period $t_{burst}$, wherein the transmitting step is completed in a determined time period $t_{burst}$, and wherein the beginning of transmitting occurs within a determined $t_{burst}$ period before the time at which the buffer completes accumulating the specified number of data blocks.

3. The method of claim 1 wherein the bus comprises a SCSI bus, wherein the mass storage device is a target mass storage device on the SCSI bus and responds to a request for the specified number of data blocks from an initiator on the SCSI bus as the other device.

4. The method of claim 3 wherein the target mass storage device comprises a hard disk drive, and further including the step of positioning a data transducer at a destination track following the step of connecting to the SCSI bus in response to the request for the specified number of data blocks and prior to the step of initiating accumulation of a first one of the specified number of data blocks into the buffer.

5. The method of claim 4 wherein the hard disk drive includes at least one data storage disk rotating at a predetermined fixed rotational rate, wherein the fixed length data blocks are stored in sectors of tracks arranged within concentric data zones on a storage surface of the disk, a number of sectors per track varying as a function of disk radius of a particular data zone, and wherein the step of determining bus reconnect time and bus release time includes a step of determining internal data transfer rate as a function of the particular data zone.

6. The method of claim 5 wherein the step of determining internal data transfer rate as a function of the particular data zone is carried out by a further step of looking up data including internal data transfer rate as a function of concentric data zone in a table maintained within a memory of the hard disk drive.

7. The method of claim 6 wherein the data including internal data transfer rate maintained in the table is expressed as a ratio of internal data transfer rate to bus data transfer rate as a function of concentric data zone and the predetermined disk rotational rate.

8. The method of claim 5 wherein the step of determining a reconnect time is carried out by the step of calculating in accordance with the expression:

$$T_{reconnect} = T_0 + \frac{xfer\_len}{channel\_rate} - \frac{xfer\_len}{host\_rate} - T_{host}$$

where:

$T_0$ represents a time when a first one of the requested data blocks is transferred into the buffer, xfer_len represents the specified number of data blocks being requested, channel_rate represents the internal data transfer rate within the hard disk drive, host_rate represents bus data transfer rate over the SCSI bus, and $T_{host}$ represents a predetermined additional time sufficient to enable the initiator to respond to reselection of the SCSI bus by the hard disk drive and ensure that data block transfer can begin at the reconnect time.

* * * * *